March 22, 1966 W. R. BISHOP 3,241,695
LOAD GRIPPER AND POSITIONING DEVICE
Filed Nov. 18, 1963 3 Sheets-Sheet 1

WILLIAM R. BISHOP
INVENTOR
Huebner & Worrel
ATTORNEYS

WILLIAM R. BISHOP
INVENTOR

ATTORNEYS

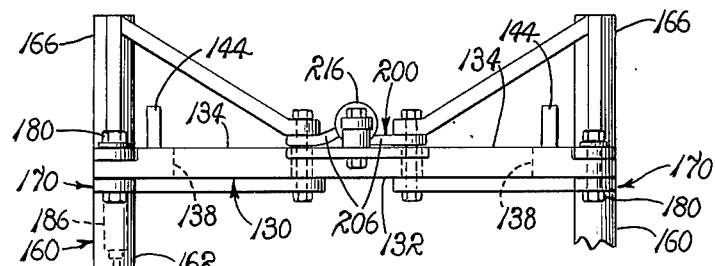
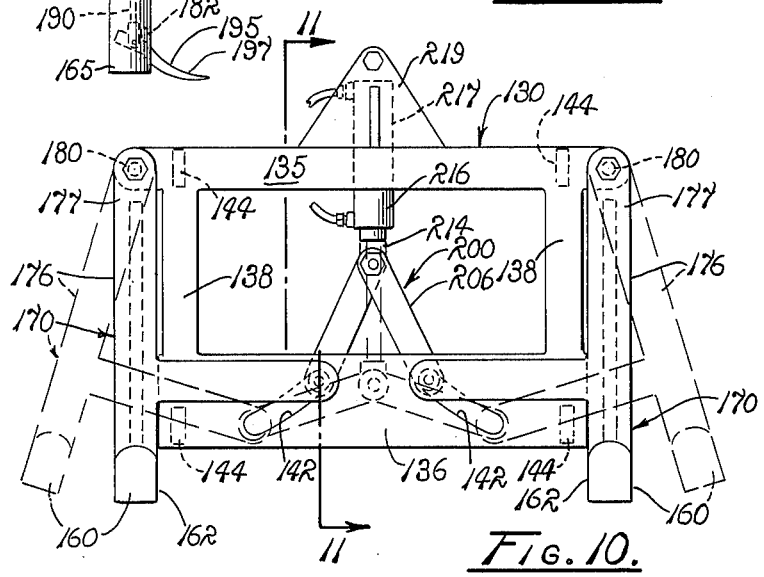
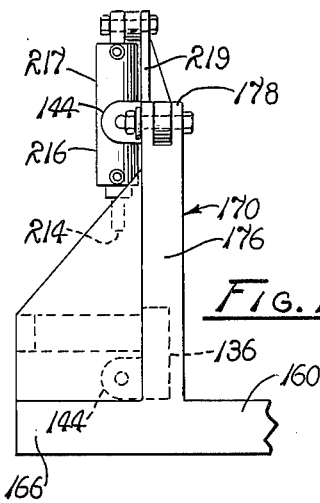
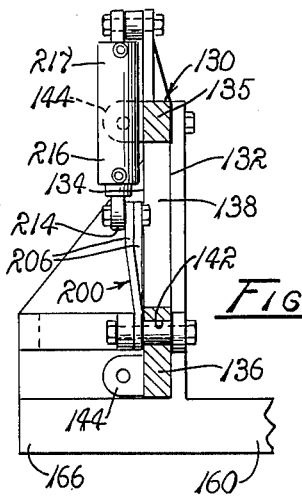
WILLIAM R. BISHOP
INVENTOR
Huebner & Worrel
ATTORNEYS

United States Patent Office 3,241,695
Patented Mar. 22, 1966

3,241,695
LOAD GRIPPER AND POSITIONING DEVICE
William R. Bishop, P.O. Box 67, Willow Ranch, Calif.
Filed Nov. 18, 1963, Ser. No. 324,480
8 Claims. (Cl. 214—147)

The present invention relates to a load positioning device and more particularly to such a positioning device which is effective to elevate, transport, and discharge a multiplicity of objects in unitary, precisely stacked relation. The device of the present invention is particularly adapted to accommodate a plurality of bales arranged by the bale stacking device described in my copending application Serial No. 324,261 entitled "Bale Stacking Attachment for Balers," filed Nov. 18, 1963, and is conveniently described in connection with such apparatus although in no sense limited to utilization therewith.

The bale stacker of the above copending application successively forms a dual layer, substantially rectangular, stack of five bales. The stack has a top layer of two bales superimposed on a bottom layer of three bales with the bales in the separate layers disposed in right angular relation. The bales are deposited in the field in such stacked relation for subsequent pickup and loading as a unit on a wagon or truck for transport to a storage area. It is found that such stacks are not readily picked up by conventional fork-type loaders customarily employed in the handling of individual or smaller stacks of bales. Such conventional loaders employ a plurality of forks or tines which must be inserted beneath the stack of bales in precise position so as to balance the bales thereon to minimize tipping during transport. Such insertion of the forks beneath a stack of bales is difficult in that individual bales are frequently shoved outwardly of the stack by thrust of the forks and require manual repositioning of the bales before the stack can be elevated. Further, once the bales are picked up, they are merely rested on the upper surfaces of the forks and, if the loader tips in traversing uneven terrain, individual bales may tumble from the stack with frequent breakage and loss of the bale material. In order to discharge the bales, the forks are usually tilted so that the bales gravitate therefrom which again causes disarrangement of the stacks and uneven stacking of the bales on a transporting vehicle or at the storage area.

Therefore, it is a broad object of the present invention to provide an improved load positioning device.

Another object is to provide a load positioning device which is effective easily to accommodate and maintain a multiplicity of bales in predetermined precisely stacked relation.

Another object is to provide such a load positioning device which is effective to elevate, transport and discharge such a stack of bales without disturbing such stacked arrangement of individual bales therein.

Another object is to provide a device of the character described having bale engaging members capable of being power operated for movement against the bales in tightly holding relation.

Another object is to provide such a load positioning device wherein such engaging members are automatically adjustable to accommodate various sizes of stacks of bales.

Other objects and advantages of the present invention will subsequently become more clearly apparent upon reference to the following description in the specification.

In the drawings:

FIG. 9 is a fragmentary top plan view of a second form of the bale stack lifting device of the present invention.

FIG. 10 is a front elevation of the second form of the present invention.

FIG. 11 is a fragmentary vertical cross section through the second form of bale lifting device taken on line 11—11 of FIG. 10.

FIG. 12 is a fragmentary side elevation of the bale lifting device of the second form of the present invention.

Figure 1:
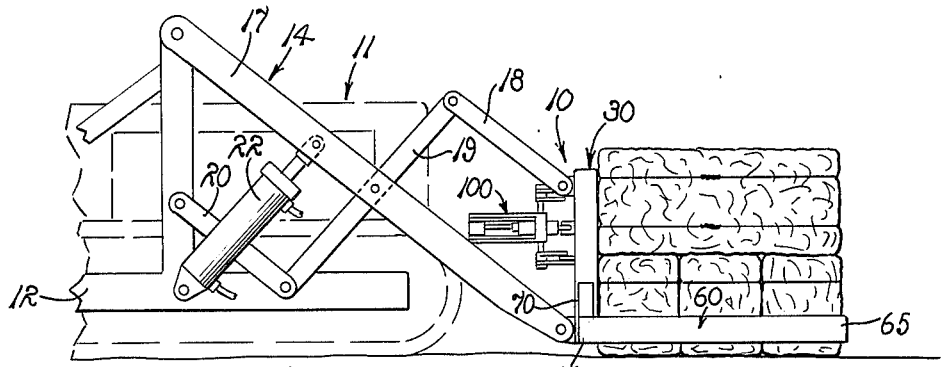
FIG. 1 is a side elevation showing the bale stack lifting device of the present invention mounted on a tractor loader lift frame.
Figure 2:
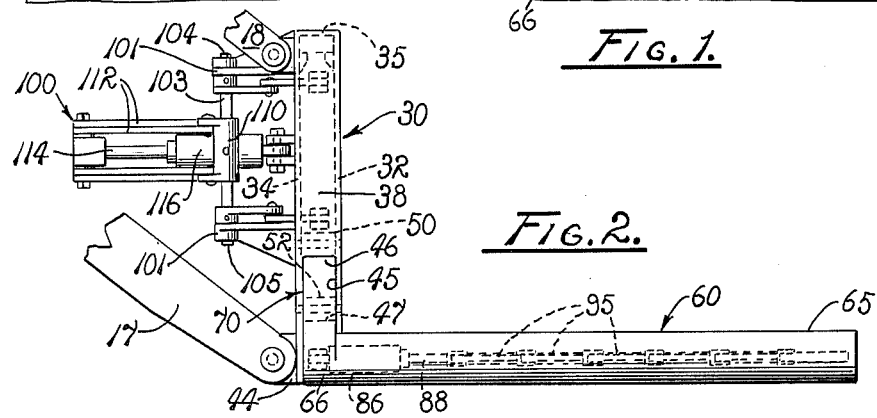
FIG. 2 is a somewhat enlarged side elevation of the bale stack lifting device of FIG. 1.

Referring more particularly to the drawings, a bale stack lifting device embodying the principles of the present invention is generally indicated by the reference numeral 10. The lifting device is shown mounted on the forward end of a tractor 11 having a truck frame 12 and a loader lift frame 14 mounted in forwardly extended relation thereon. The lift frame conventionally includes a pivotally mounted lift arm 17 and a plurality of control links 18, 19 and 20 in parallelogram arrangement with the lift arm 17. A hydraulic lift jack 22 is mounted between the lift arm and the truck frame of the tractor for elevationally positioning the forwardly extended end of the loader lift frame 14.

The bale stack lifting device 10 provides a bale stack backing wall 30 which includes spaced front and rear plates 32 and 34, respectively, of substantially rectangular configuration. The front and rear plates are connected by a top plate 35, a bottom plate 36 and opposite side plates 38, which bound an interior compartment 39. The rear plate 34 has a pair of spaced substantially parallel slots 42 therethrough in communication with the compartment 39. A pair of sets of brackets 44 are mounted on the rear plate 34 individually adjacent to the corners formed between the top, bottom and side plates of the wall for pivotally connecting the wall on the forward end of the loader lift frame 14. In such connected position, the bale stack backing wall 30 is disposed forwardly of the tractor 11 in a plane substantially normal to the direction of earth traversing movement of the tractor. The opposite side plates 38 provide an opening 45 therethrough having upper and lower edges 46 and 47 in transversely aligned relation adjacent to the bottom plate 36 of the wall. A plurality of upper and lower rollers 50 and 52, respectively, are rotatably mounted within the compartment 39 of the wall between the front and rear plates 32 and 34 and have peripheral portions disposed in substantially tangentially aligned relation with their respective upper and lower edges of the openings 45.

A pair of elongated bale compressing arms 60 of box section construction are disposed on opposite sides of the back stacking wall 30 longitudinally aligned with the direction of travel with the tractor 11 and in right angular relation to the wall. The arms include facing inner surfaces 62 disposed in spaced substantially parallel relation. The box section construction of the arms 60 bounds an elongated compartment 64 and the arms have forward ends 65 and rearward ends 66. A transversely inwardly extended leg 70 has an upwardly extended portion 72 mounted on the rearward end of the arms and an integral inner end portion 74. The inner end portion of the leg is extended through the openings 45 in the side plates of the wall 30 in rolling engagement with the peripheries of the upper and lower rollers 50 and 52 within the compartment 39 of the wall. A post 76 is integrally upwardly extended from the inner end 74 of the leg and terminates in an upper end 77 adjacent to the top plate 35. A roller 78 is mounted on the upper end 77 of the post rollably to engage either of the inner surfaces of the front and rear plates 32 and 34, respectively. A pair of vertically spaced brackets 79 are mounted on the post 76 in transversely inwardly extended relation.

The inner surfaces 62 of the bale compressing arms 60 have a plurality of longitudinally equally spaced openings 80 therethrough. A plurality of camming blocks 82 are rigidly mounted on the arms forwardly adjacent to the openings and have a rearwardly facing arcuately curved camming surface 84. A hydraulic jack 86 is mounted in the rearward ends 66 of each of the bale compressing arms 60 and is adapted for connection through suitable hoses 87 to a source of hydraulic fluid, not shown, on the tractor 11. The jacks include an elongated piston rod 88 which mounts a U-shaped connector 89 thereon. A pair of tie bars 90 provide a rearward end 91 pivotally mounted on the connector 89 and an opposite forward end 92 terminating short of the forward ends 65 of the arms. A plurality of bale penetrating fingers 95 provide mounting ends 96 pivotally mounted between the tie bars 90 in longitudinally equally spaced relation therealong and opposite arcuately curved blade portions 97 having forwardly facing arcuately curved surfaces 98 corresponding to the camming surfaces 84 of the cam blocks 82 for sliding movement thereagainst during extension and retraction of the piston rods 88 of the hydraulic jacks 86.

Figure 3:
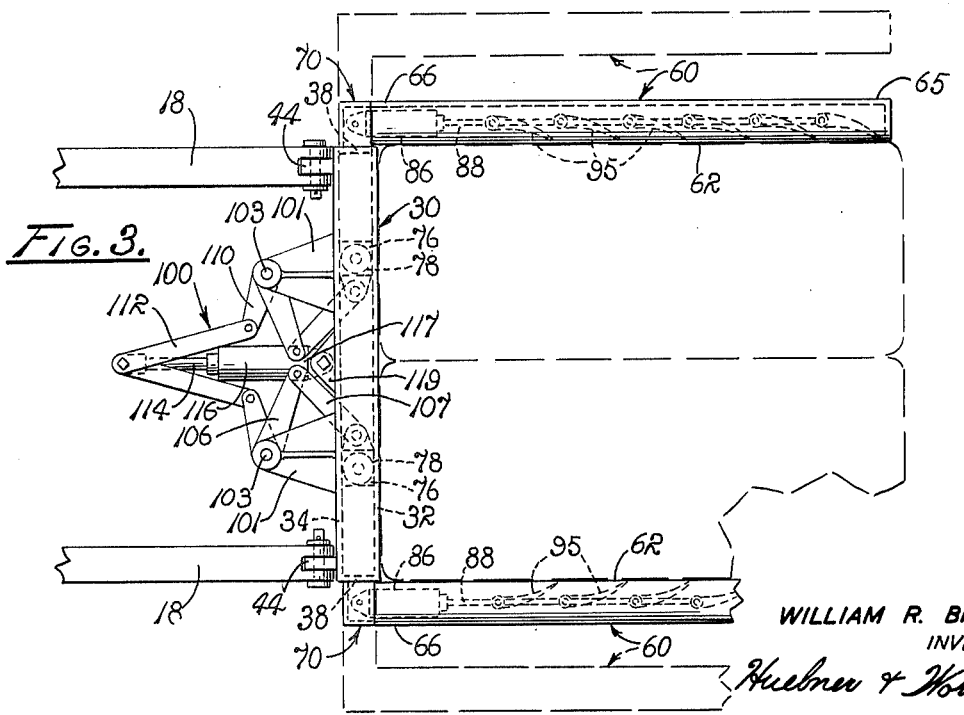
FIG. 3 is a top plan view of the bale stack lifting device showing the bale stack engaging arms thereof extended in dashed line position.
Figures 4, 5:
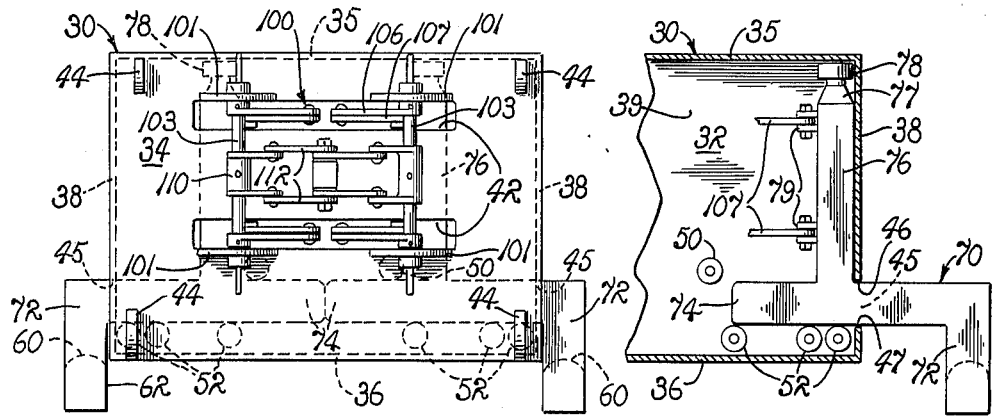
FIG. 4 is a rear elevation of the lifting device with the stack engaging arms shown in retracted position.
FIG. 5 is a fragmentary rear elevation of one of the bale stack engaging arms shown in full line extended position.
Figure 6:
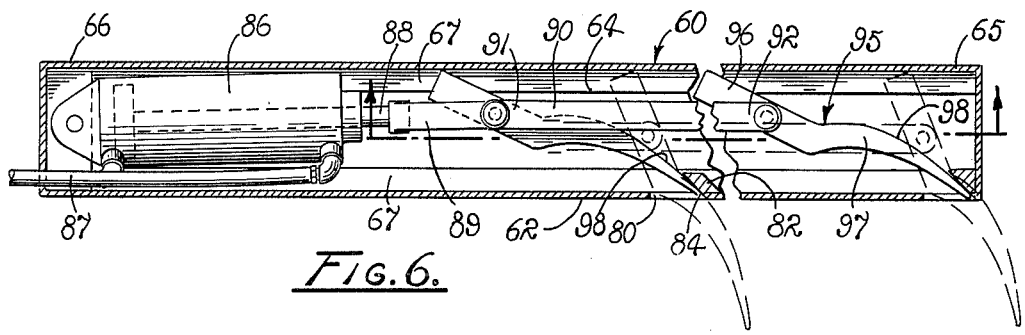
FIG. 6 is a longitudinal central section through the bale engaging arms with portions broken away for illustrative convenience showing a plurality of fingers mounted therein in retracted full line position and extended dashed line position.
Figures 7, 8:
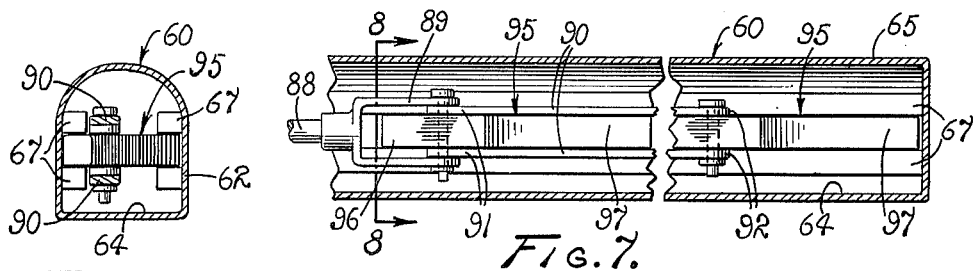
FIG. 7 is a longitudinal section through the bale engaging arm taken on line 7—7 of FIG. 6.
FIG. 8 is a transverse vertical section taken generally along the line 8—8 of FIG. 7.

As best shown in FIG. 4, the bale compressing arms 60 are correspondingly actuated transversely toward and away from each other by a set of power actuated toggle links, generally indicated by the reference numeral 100. Such links are mounted on a pair of upper and lower transversely spaced sets of rearwardly extended brackets 101 and 102 rigidly mounted on the rear plate 34 of the backing wall 30. Each pair of upper and lower transversely spaced sets of brackets mounts an elongated substantially upright pivot shaft 103 having an upper end 104 and a lower end 105. A plurality of inwardly extended links 106 are connected to the pivot shafts for rotation therewith which are connected at their extended ends to a link 107 extended through the slots 32 in the rear plate 34 for connection with the brackets 79 on the upstanding post 76 of the bale compressing arms, as shown in FIGS. 3 and 5. Eccentric arms 110 are individually rigidly connected to the pivot shafts 103 intermediate opposite ends of said shafts and individually pivotally connected to links 112 which in turn are pivotally connected to the rod end 114 of a hydraulic jack 116. The jack includes a cylinder end 117 which is pivotally mounted between a pair of brackets 119 secured to the rear plate 34 of the backing wall 30 between the slots 42 therein.

*Second form*

A second form of bale stack lifting device embodying the principles of the present invention is shown in FIGS. 9 through 12. Such second form of the invention provides a support frame 130 comparable to the stack backing wall 30 of the first form of the invention. The frame provides opposite forwardly and rearwardly disposed surfaces 132 and 134 formed by interconnected top, bottom and side plates 135, 136 and 138, respectively. The bottom plate 136 has a pair of transversely spaced arcuate slots 142 therethrough. A plurality of rearwardly extended brackets 144, similar to the brackets 34 of the first form, are provided for connection with the forward end of the loader lift frame 14 of FIG. 1.

A pair of opposite bale compressing arms 160 of box section construction provide elongated inner surfaces 162 disposed in spaced substantially parallel relation. Each of the arms has an elongated compartment 164 therein and has a forward end 165 and a rearward end 166. A transversely inwardly extended leg 170 is disposed in integral coplanar relation with an upstanding post 176 having an upper end 177. The upper end of the post is pivotally mounted on an outwardly extending end 178 of the top plate 135 of the support frame 130 for swinging movement of the bale compressing arms 160 between the full line and extended dashed line positions of FIG. 10. The inner leg 170 of the arm is disposed adjacent to the forward side surface 132 of the support frame and on its inner end mounts a pivot pin 180 extended through its respective arcuate slot 142 in the bottom plate 136. As best shown in FIG. 9, the opposite end of the pivot pin mounts a brace 182 which is rigidly secured at its opposite end to the rearward end 166 of the arm 160.

As in the first form, the arms 160 of the second form of the invention also provide a plurality of openings 183 through the inner surfaces 162 thereof, as fragmentarily shown in FIG. 9. A plurality of camming blocks 184 are disposed forwardly adjacent to the openings. A hydraulic jack 186 is disposed within the arms and provides a rod end 188 pivotally connected to a pair of tie bars 190 longitudinally extended through the arms. A plurality of bale penetrating fingers 195 are pivotally mounted on the tie bars and include blade portions 197 engageable against the camming blocks for extension through the openings 183 outwardly of the inner surfaces of the arms.

The bale compressing arms 160 of the second form of the invention are adapted to be motivated in concurrent swinging relation by a set of power actuated links generally indicated at 200. Such linkage provides a pair of links 206 which are pivotally mounted at their lower ends on the pivot pin 180 adjacent to the rearward surface 134 of the support frame 130. The upper ends of the links converge in overlapped relation for pivotal connection to a rod end 214 of a hydraulic jack 216. The jack includes a cylinder end 217 pivotally mounted on an upstanding bracket 219 on the top plate 135 of the support frame.

*Operation*

The operations of the described embodiments of the subject invention are believed to be clearly apparent and are briefly summarized at this point.

*First form*

Before a stack of bales, such as that indicated in FIG. 1, is approached by the tractor 11, the hydraulic jack 116 is retracted from its full line position of FIG. 3 to extend the bale compressing arms 60 transversely outwardly from the stack backing wall 30. The hydraulic jack 116 is connected to a source of hydraulic fluid under pressure, not shown, on the tractor and is controlled by suitable valving associated therewith. During such retraction of the jack, the links 112 are drawn toward the backing wall 30 to rotate the eccentric arms 110 and their respective pivot shafts 103 toward the wall. Such movement also causes the adjacent ends of the links 106 to move in the same substantially linear direction toward the backing wall 30 concurrently to push transversely oppositely on their respective upright posts 76 to separate the legs 70 of the opposite arms. During such movement, the legs are rollably supported on the upper and lower rollers 50 and 52 as the arms are motivated from their retracted position of FIG. 4 to their extended position of FIG. 5. The arms 60 are further stabilized during such movement by the rollers 78 rollably engaging either of the front or rear plates 32 and 34 of the wall.

The loader lift frame 14 of the tractor is adjusted by the lift jack 22 to position the backing wall 30 and bale compressing arms 60 in a position closely adjacent to the ground. The tractor is then aligned with the stack of bales and is moved forwardly so that the stack of bales is received between the inner surfaces 62 of the bale compressing arms and against the backing wall 30. The hydraulic jack 116 is then actuated to extend its rod end 114 toward its extended position of FIG. 3 to retract the bale compressing arms 60 tightly against the opposite sides of the stack of bales. The hydraulic jacks 86 in the compressing arms 60 are then actuated by suitable valving, not shown, on the tractor to extend the rod ends 88 and the tie bars 90 toward the forward ends 65 of the arms. Such movement causes the mounting ends 96 of the bale penetrating fingers 95 to be displaced forwardly within the arms so that the blade portions 97 of the fingers are engaged against the camming surface 84 of the cam blocks 82. Each of the fingers thereby pivots about its connection on the tie bars 90 and is extended outwardly through its opening 80 in the arms for penetration into the bales compressed between the arms 60. The loader lift frame is then elevated by extension of the lift jack 22 to raise the stack of bales in upright attitude by the control links 18, 19, and 20 of the loader lift frame which substantially precludes tipping of the stack of bales. During transport of the stack of bales, the fingers 95 effectively constrains the stack between the arms 60 and assure against any endward or downward slipping of the bales from the lifting device.

The stack of bales is then positioned by the tractor on a wagon or truck for removal from the field or in a stack of bales at a storage area. With the bales so positioned, the rod end 88 of the hydraulic jack 86 is retracted to motivate the tie bars 90 rearwardly through the bale compressing arm 60. With such movement, the blade portions 97 of the fingers are cammed against the camming blocks 82 for retraction from the bales into the compartment 64 of the arms 60. The hydraulic jack 116 is then again retracted to separate the arms 60 and the tractor is backed from the stack for complete removal of the bales from between the arms. It is to be noted that the stack of bales is discharged from the bale stack lifting device 10 without tipping or any disarrangement of the bales from their initially placed position in the stack.

*Second form*

The bale stacking device having the support frame 130 of the second form is positioned with respect to the stack of bales of FIG. 1 in an identical manner as that described in the operation of the first form. In this form, however, the bale compressing arms 160 are pivoted outwardly of the frame about the pivotal connections between the post 176 and the top plate 135 by extension of the rod end 214 of the hydraulic jack 216. Such movement causes the lower end of the links 212 and the pivot pins 180 to slide outwardly through the arcuate slots 142 to pivot the inner end of the legs 170 downwardly and the arms outwardly of the frame. With the stack of bales positioned against the support frame 130 and between the bale compressing arms 160, the hydraulic jack 216 is actuated to retract the rod end thereof to pull the links 212 upwardly in converging relation. During such movement, the pivot pins 180 move upwardly through the slots 142 to draw the legs 170 inwardly of the frame and draw the legs 160 against the stack of bales. As in the first form, the hydraulic jacks 186 are actuated to extend the bale penetrating fingers 195 outwardly through the openings 184 in the arms into the stack of bales compressed between the arms 106.

After transporting and positioning the stack in the above described manner, the fingers are retracted by retraction of the rod ends of the hydraulic jacks 186 and the bale compressing arms 160 are swung outwardly to liberate the stack of bales therebetween without disturbing the bales in the stack.

In view of the foregoing, it is readily apparent that the structures of the present invention have provided improved bale stack lifting devices which are effective to lift, transport and discharge a stack of bales while maintaining the precise stacked arrangement of the bales during such operations. Also, with the structures of the present invention, the stacks need not be tilted during either the pickup or discharging operations as with conventional bale handling devices. The bale penetrating fingers effectively hold the bales in precisely stacked arrangement between the bale compressing arms and are readily retracted from the bales into the arms for ready removal of the arms from the stack of bales.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for grasping and elevationally positioning a load comprising a support, means mounting the support for travel, a pair of compressing members mounted on the support in spaced relation for relative movement toward and from each other, power means operably connected to the compressing members for controlled relative movement thereof, penetrating means borne by the compressing members for reciprocal movement relative thereto between retracted positions and positions extended toward their respective opposite compressing member, and second power means operably connected to the penetrating means for controlled movement thereof between said retracted and extended positions.

2. A load positioning device, adapted to be mounted on a vehicle having a loader frame extended therefrom which is elevationally adjustable to support said load positioning device, comprising a support member mounted on the loader frame of the vehicle having predetermined forward and rearward sides, a pair of load compressing members mounted on the support member in spaced relation having facing inner load engaging surfaces, power operated linkage means mounted on said rearward side of the support member in connecting relation between the load compressing members simultaneously to motivate said members to cause the inner surfaces thereof to move toward and away from each other, load penetrating means mounted for extension outwardly from the inner surfaces of the load compressing members and for retraction thereto, and controlled powered means connected to the penetrating means for extension and retraction thereof.

3. A load positioning device, adapted to be mounted on a vehicle having a loader frame extended therefrom elevationally adjustably supporting said load positioning device, comprising a support member mounted on the loader frame of the vehicle having predetermined forward and rearward sides, a pair of load compressing members movably mounted on the support member in spaced relation having facing inner load engaging surfaces, power operated linkage means mounted on said rearward side of the support member in connecting relation between the load compressing members simultaneously to motivate said members to cause the inner surfaces thereof to move toward and away from each other, load penetrating means pivotally mounted on said load compressing members for extension outwardly of the inner surface thereof and for retraction thereto, and controlled power means having controlling connection to the load penetrating means.

4. A bale stack lifting device, adapted to be mounted on a vehicle having a loader frame extended therefrom elevationally adjustably supporting said lifting device for transporting and positioning stacks of bales, comprising a support member mounted on the loader frame of the vehicle having predetermined forward and rearward sides, a pair of bale compressing members movably mounted on the support member in spaced relation having facing inner bale engaging surfaces, power operated linkage means mounted on said rearward side of the support member in connecting relation between the bale compressing members simultaneously to motivate said members to cause their inner surfaces to move toward and away from each other, power means mounted on the compressing members, and bale penetrating means pivotally mounted on the compressing members connected to said power means for extension outwardly of the inner surfaces thereof incident to actuation of said power means positively to hold such a stack of bales between the compressing members.

5. A bale stack lifting device, adapted to be mounted on a vehicle having a loader frame extended therefrom elevationally adjustably supporting said lifting device for transporting and positioning stacks of bales, comprising a support member mounted on the loader frame of the vehicle having predetermined forward and rearward sides, a pair of bale compressing members slidably mounted on the support member in spaced substantially parallel relation having facing inner bale engaging surfaces defining a bale stack receiving area between said surfaces and the support member, power operated linkage means mounted on said rearward side of the support member in connecting relation between the bale compressing members simultaneously to motivate said inner surfaces thereof toward and away from each other, power means mounted on the compressing members adjacent to said support member, and a plurality of bale penetrating members pivotally mounted on said bale compressing members for extension outwardly of the inner surfaces thereof into said bale receiving area incident to actuation of the power means positively to hold such a stack of bales in said bale stack receiving area.

6. A bale stack lifting device, adapted to be mounted on a vehicle having a loader frame extended therefrom elevationally adjustably supporting said lifting device for transporting and positioning stacks of bales, comprising a support member mounted on the loader frame of the vehicle having predetermined forward and rearward sides; a pair of elongated bale compressing arms of box section construction providing a hollow interior having inwardly extended right angularly related legs slidably mounted on the support member to position said arms in spaced substantially parallel relation, said arms having facing inner bale engaging surfaces providing a plurality of openings therethrough; power operated linkage means mounted on said rearward side of the support member in connecting relation between the legs of the bale compressing arms simultaneously to motivate said inner surfaces thereof toward and away from each other; power means mounted within said bale compressing arms adjacent to said support member; link means pivotally mounted on said power means and longitudinally extended therefrom through the bale compressing arms; and a plurality of bale penetrating members pivotally mounted on said link means within the bale compressing arms being extendable outwardly through said openings in the inner surfaces thereof incident to actuation of the power means positively to hold such a stack of bales between the compressing arms.

7. A bale stack lifting device, adapted to be mounted on a vehicle having a loader frame longitudinally extended therefrom elevationally adjustably supporting said lifting device for transporting and positioning stacks of bales, comprising a bale stack backing wall mounted on the loader frame of the vehicle having predetermined forward and rearward surfaces and transversely opposite sides; a pair of elongated bale compressing arms of box section construction providing a hollow interior having inwardly transversely extended right angularly related legs slidably mounted in the bale stack backing wall adjustably to position said arms in selectively transversely spaced substantially parallel relation, said arms having facing inner bale engaging surfaces defining a bale receiving area between the backing wall and the inner surfaces of the arms, said inner surfaces of the arms providing a plurality of longitudinally equally spaced openings therethrough; power operated linkage means mounted on said rearward surface of the backing wall in connecting relation between the legs of the bale compressing arms simultaneously to motivate said inner surfaces thereof toward and away from each other to adjust said bale receiving area; power means mounted within said bale compressing arms adjacent to said backing wall; link means pivotally mounted on said power means and longitudinally forwardly extended therefrom within the bale compressing arms; and a plurality of bale penetrating fingers pivotally mounted on said link means within the bale compressing arms being extendable outwardly through said openings in the inner surfaces thereof into said bale receiving area incident to actuation of the power means positively to hold such a stack of bales in the stack receiving area.

8. A bale stack lifting device, adapted to be mounted on a vehicle having a loader frame longitudinally extended therefrom elevationally adjustably supporting said lifting device for transporting and positioning stacks of bales, comprising a substantially rectangular bale stack backing wall mounted on the loader frame of the vehicle having predetermined spaced front and rear plates, transversely opposite side plates, and top and bottom plates, said rear plate having elongated slots therethrough, said side plates providing openings therethrough adjacent to said bottom plate of the wall; a pair of elongated bale compressing arms of box section construction providing a hollow interior having inwardly transversely extended right angularly related legs extended through said openings in the side plates of the backing wall and slidably mounted therein adjustably to position said arms in selectively transversely spaced substantially parallel relation; substantially upright post members integrally upwardly extended from said legs terminating in upper ends adjacent to said top plate of the wall, a roller mounted on said upper end of the posts in rolling engagement with said front and rear plates of the wall, said bale compressing arms having facing inner bale engaging surfaces defining a bale receiving area between the backing wall and the inner surfaces of the arms, said inner surfaces of the arms providing a plurality of longitudinally equally spaced openings therethrough; a plurality of camming blocks mounted within said bale compressing arms forwardly adjacent to each of said openings in the inner surfaces thereof; power operated linkage means mounted on said rear plate of the backing wall and extended through said slots therein in connecting relation between the upright posts of the bale compressing arms simultaneously to motivate said inner surfaces thereof toward and away from each other for adjusting said bale receiving area; power means mounted within said bale compressing arms adjacent to said backing wall; an elongated tie bar connected to said power means and longitudinally forwardly extended therefrom within the bale compressing arms; and a plurality of arcuately curved bale penetrating fingers pivotally mounted on said tie bar within the bale compressing arms slidable against said camming blocks for movement between an extended position with the fingers disposed outwardly through said openings in the inner surfaces of the bale compressing arms into said bale receiving area incident to extension of said power means positively to hold such a stack of bales in the stack receiving area and upon retraction of said power means, said fingers being retractable through said openings against the camming blocks into the bale compressing arms to liberate the stack of bales in the stack receiving area.

References Cited by the Examiner

UNITED STATES PATENTS

| | | | |
|---|---|---|---|
| 2,536,151 | 1/1951 | Backofen et al. | 214—653 |
| 2,734,646 | 2/1956 | Stimson | 214—147 |

FOREIGN PATENTS

| | | |
|---|---|---|
| 132,932 | 5/1949 | Australia. |

HUGO O. SCHULZ, *Primary Examiner.*